US009456468B2

(12) United States Patent
Fry

(10) Patent No.: US 9,456,468 B2
(45) Date of Patent: Sep. 27, 2016

(54) TRAILER ACCESS POINT PAIRING

(71) Applicant: Knorr-Bremse Systems For Commercial Vehicles Limited, Bristol (GB)

(72) Inventor: Matthew Fry, Bristol (GB)

(73) Assignee: Knorr-Bremse Systems for Commercial Vehicles Limited, Bristol (GB)

( * ) Notice: Subject to any disclaimer, the term of this patent is extended or adjusted under 35 U.S.C. 154(b) by 0 days.

(21) Appl. No.: 14/029,357

(22) Filed: Sep. 17, 2013

(65) Prior Publication Data

US 2014/0081543 A1    Mar. 20, 2014

(30) Foreign Application Priority Data

Sep. 17, 2012    (GB) .................................. 1216567.6

(51) Int. Cl.
| | |
|---|---|
| H04W 88/00 | (2009.01) |
| B60T 7/00 | (2006.01) |
| B60T 8/17 | (2006.01) |
| G07C 5/00 | (2006.01) |
| B60T 7/16 | (2006.01) |
| B60T 7/18 | (2006.01) |
| B60T 7/20 | (2006.01) |
| B60T 7/22 | (2006.01) |
| B60T 8/32 | (2006.01) |

(52) U.S. Cl.
CPC ................ *H04W 88/00* (2013.01); *B60T 7/00* (2013.01); *B60T 7/16* (2013.01); *B60T 7/18* (2013.01); *B60T 7/20* (2013.01); *B60T 7/22* (2013.01); *B60T 8/17* (2013.01); *B60T 8/323* (2013.01); *G07C 5/00* (2013.01)

(58) Field of Classification Search
None
See application file for complete search history.

(56) References Cited

U.S. PATENT DOCUMENTS

| | | | | |
|---|---|---|---|---|
| 5,969,433 | A * | 10/1999 | Maggiora et al. | ............ 307/10.5 |
| 9,260,078 | B2 * | 2/2016 | Mederer | ............... B60T 8/1708 |
| 2003/0233189 | A1 * | 12/2003 | Hsiao et al. | ................... 701/207 |
| 2006/0011721 | A1 * | 1/2006 | Olsen et al. | ................... 235/385 |
| 2006/0089987 | A1 * | 4/2006 | Igarashi | ............ H04L 29/12783 709/225 |
| 2006/0208873 | A1 | 9/2006 | Lesesky et al. | |
| 2006/0284476 | A1 * | 12/2006 | Choucair | ............ B60R 25/2018 303/7 |
| 2007/0241868 | A1 | 10/2007 | Fackrell et al. | |
| 2008/0303648 | A1 * | 12/2008 | Day | ......................... B60D 1/62 340/431 |
| 2010/0057332 | A1 * | 3/2010 | Katoh et al. | ................... 701/113 |

FOREIGN PATENT DOCUMENTS

| | | | | | |
|---|---|---|---|---|---|
| IT | WO 2005115811 | A1 * | 12/2005 | ......... | B60R 25/0225 |
| WO | WO 9419219 | A1 * | 9/1994 | | |
| WO | WO 2006089284 | A2 * | 8/2006 | | |

* cited by examiner

Primary Examiner — Rami Khatib
Assistant Examiner — Jeffrey Boomer
(74) Attorney, Agent, or Firm — Kenyon & Kenyon LLP

(57) ABSTRACT

A trailer electronic braking system comprising a braking device capable of generating a braking force on a wheel on the trailer. The braking force is applied to brake cylinders and is controllable by a braking ECU, which braking ECU is connected to a standards compliant communication bus on the trailer. The ECU is adapted to receive data inputs from sensors, on the trailer. The system further includes an arrangement to interface to trailer electronics and a communications interface having a 802.11 wireless card adapted to transmit an SSID. The braking system is adapted to transmit a trailer identifier comprising the SSID. The trailer identifier can be paired with a further device previously provided with the trailer identifier. The braking system enables the SSID to be changed to a second SSID when a pre-determined condition is met.

15 Claims, 2 Drawing Sheets

TRAILER ACCESS POINT PAIRING

RELATED APPLICATION INFORMATION

The present application claims priority to and the benefit of United Kingdom Patent Application No. 1216567.6, filed on Sep. 17, 2012, the disclosure of which is incorporated herein by reference.

FIELD OF THE INVENTION

The present invention relates to a trailer electronic braking system.

BACKGROUND INFORMATION

The trend in modern distribution systems is towards having large distribution depots located on the outskirts of towns and cities near main trunk roads. These large distribution depots have a number of significant logistical advantages for the operators in terms of stock control and speed and ease of distribution of goods. However, depots have become larger with many having dozens or even hundreds of trailers on site and allocated a job at any one time. In particular for larger companies, it has become difficult to track the trailer use in the depot due to the sheer number of trailers and due to the use of standardized trailers having identical appearance.

Furthermore, trailers for many goods are loaded and then moved from a known loading bay to a parking area to await a tractor or prime mover to take it to its destination. Trailers used in this environment will be assigned a trailer number or identifier. To reduce the risk that a driver takes the wrong trailer, there is usually an independent manual check at the exit gate that the driver has taken the correct trailer.

This system has given rise to significant logistical efficiencies but is still prone to human error and has a high degree of manual input. This slows down the operation of the trailer depot and results in additional costs for operators due to the inefficient use of resources.

United States Patent Application Publication No. 2007/0241868 relates to a retrofitable tractor-trailer remote communications and monitoring system, which system is connectable to a tractor and trailer via the tractor power line and is configured to transmit and receive communication signals remotely. The system comprises a tractor processing unit adapted to provide a tractor identifier, to send data to a remote location and receive data from a remote location. The system further comprises a trailer control unit adapted to provide a trailer identifier and to send data to a remote location, and retrofitting an arrangement arranged to facilitate data exchange between the tractor processing unit and the trailer control unit. Thus, the system allows the tractor and trailer to exchange date through the power line.

United States Patent Application Publication No. 2006/0208873 discloses a system, an apparatus, and methods for data communications associated with a vehicle. The apparatus comprises at least one electronic subsystem associated with the vehicle and a plurality of electrical conductors connected to the at least one electronic subsystem. The apparatus further comprises a transceiver connected to a data communications protocol converter. The vehicle data communications protocol converter is connected to the plurality of electrical conductors for converting a first data communications protocol associated with data communications along the plurality of electrical conductors to a second data communications protocol such as an infrared, an RF data, an Internet, or other network communications protocol. The transceiver transmits the second data communications protocol from the vehicle and receives the data communications protocol from another portion of the vehicle, a remote data communications terminal, another vehicle, or another communications network.

Patent document BE1057702 relates to a parking brake system for a trailer. The system comprises an unlocking unit which sends electrical current to circuits to enable solenoid valves to be opened when an authorised person has been identified. Opening of the solenoid valves unlock the parking brake. The unlocking unit receives information and a signal from a unit or a processor, which unit or processor are configured to receive and authenticate a code entered by the authorised person.

SUMMARY OF THE INVENTION

The present invention seeks to provide apparatus to assist depot operators in the optimization of the use of trailers.

According to the invention there is provided a trailer electronic braking system comprising a braking device capable of generating a braking force on a wheel on the trailer, a brake force into the brake cylinders being controllable by a braking ECU, which braking ECU is connected to a standards compliant communication bus on the trailer and is adapted to receive data inputs from sensors on the trailer, wherein the system further includes an arrangement to interface to trailer electronics and a communications interface, wherein the brake system is further adapted to transmit a trailer identifier, such that the trailer identifier can be paired with a further device, which further device has previously been provided with the trailer identifier, wherein the communication interface comprises a 802.11 wireless card, which card is adapted to transmit an SSID, the trailer identifier comprising the SSID, wherein the SSID is changed to a second SSID when a pre-determined condition is met.

The trailer electronic braking system may be provided with a list of MAC addresses associated with allowable further devices, the braking system detecting the MAC address of any further devices it detects such that it only pairs with an allowable MAC address.

The further device may be provided with parking brake releases codes, which codes can be transmitted to the braking ECU after pairing to thereby release the parking brake.

The pairing information may be sent by SMS or e-mail to the driver. The SMS or e-mail may include codes to release the parking brake on the trailer. Alternatively, it would be possible to pair the trailer and tractor using a barcode or 2D barcode, which is readable using a smartphone or similar device. The required barcode could be sent to the smartphone and matched.

The system of the invention advantageously avoids the undesired pairing of tractors and trailers, which might otherwise occur in trailer depots and similar locations. In this embodiment, the present invention advantageously permits the adoption of this system in very large trailer depots, where there may be hundreds of trailers and hundreds of wireless systems, which would otherwise become confusing for the driver and operator.

BRIEF DESCRIPTION OF THE DRAWINGS

Exemplary embodiments of the invention will now be described in greater detail with reference to the drawings.

BRIEF DESCRIPTION OF THE DRAWINGS

Figure 1:
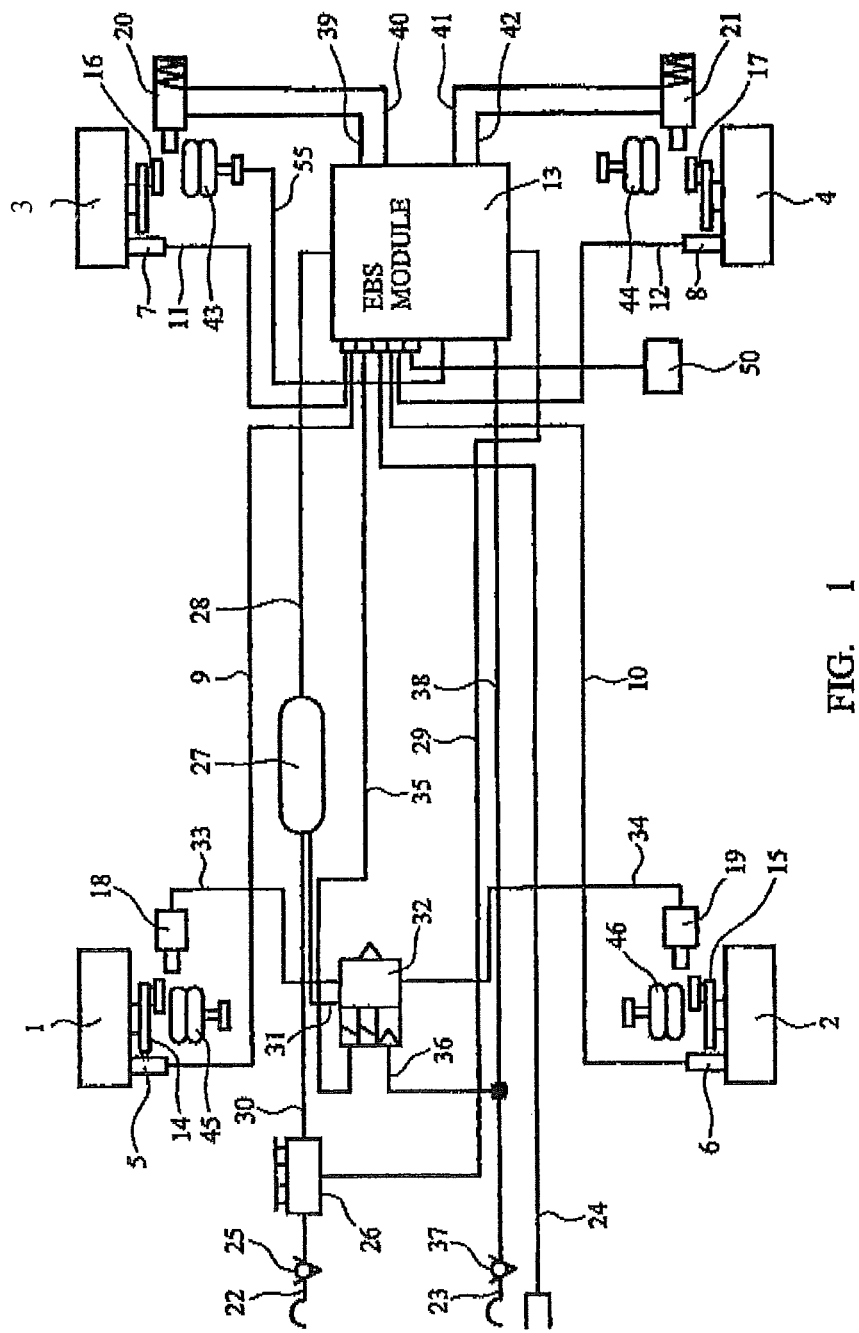

FIG. 1 shows a trailer electronic braking system.

Figure 2:
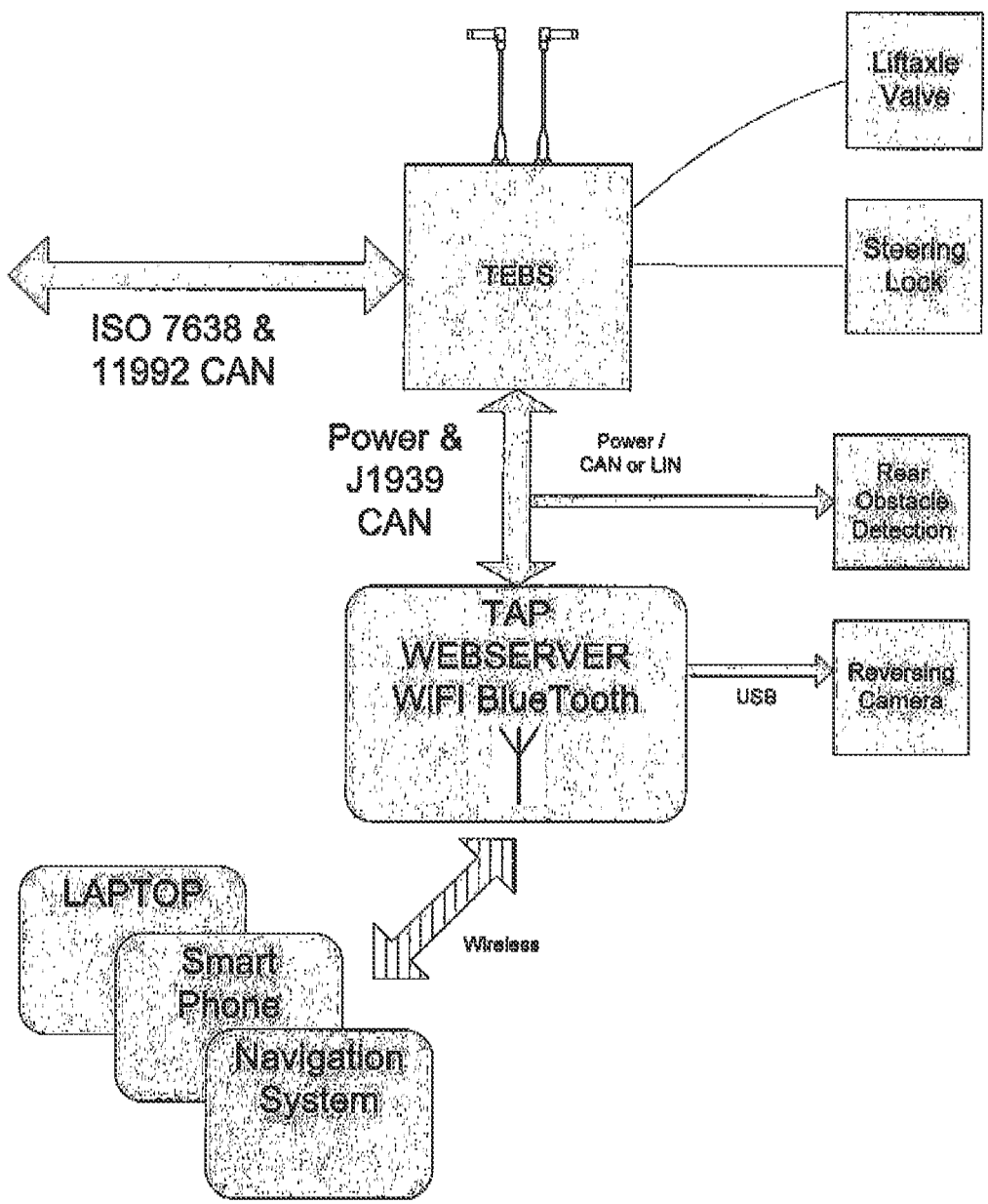

FIG. 2 shows a schematic diagram of the brake control with a trailer access microcontroller.

DETAILED DESCRIPTION

The utility vehicle trailer has a steerable front axle with front wheels 1, 2 and a rear axle with rear wheels 3, 4. Rotational wheel speed sensors 5-8 are in each case assigned to the front wheels 1, 2 and the rear wheels 3, 4, and are connected by way of electric lines 9-12 with an electropneumatic brake pressure control module 13 (EBS module) which is primarily assigned to the rear axle brakes. One brake 14-17 is in each case assigned to the front wheels 1, 2 and the rear wheels 3, 4, which brake 14-17 can be applied by brake cylinders 18, 19 of the front axle or spring-loaded brake cylinders 20, 21 of the rear axle.

The braking system of the trailer vehicle can be connected by way of three connections, specifically a pneumatic supply line connection 22, a pneumatic control line connection 23 and an electric control connection 24, with the braking system of a tractor or a further trailer. The electric control line 24 provides the ISO 11992 CAN data connection.

The supply line connection 22 is connected by way of a filter valve 25 and a parking valve 26 with an air brake reservoir 27. From the air brake reservoir 27, a pneumatic line 28, 30 leads to a supply input of the pressure control module 13 and electropneumatic valve 32, which is adapted to supply ABS functionality. In addition, a pneumatic line 29 branches off the parking valve 26 to the pressure control module 13. A pneumatic line 30 extends between the parking valve 26 and the air brake reservoir 27.

The electropneumatic valve 32 is assigned jointly to both brake cylinders 18, 19 of the front axle and is connected with the brake cylinder 18 by way of a pneumatic line 33 and with the brake cylinder 19 by way of a pneumatic line 34. The valve 32 has two electric control inputs which are connected by way of "one" electric communication line 35 such as CAN, shown here only schematically, with the pressure control module 13.

Furthermore, the valve 32 has a pneumatic control input 36 which is connected by way of a filter valve 37 with the pneumatic control connection 23. The pneumatic control input 36 is also connected by way of a pneumatic control line 38 with a pneumatic control input of the pressure control module 13. The pressure control module 13 has an integrated pressure sensor (not shown) which measures the pressure in the pneumatic control line 38, that is, the control pressure present at the pneumatic control input 36 of the electropneumatic valve, which control pressure is identical to the maximal pressure which can be controlled into the brake cylinders 18, 19.

The pressure control module 13 has pneumatic outputs 39-42 which are connected by way of assigned pneumatic lines with the spring brake cylinders 20 or 21.

Furthermore, air bellows 43, 44 are provided at the rear axle and permit a determination of the axle load, particularly of the dynamic axle load during braking and starting. The air bellows 43, 44 are connected by way of pneumatic lines with the pressure control module 13. The pressure control module 13 has an integrated pressure sensor (not shown) which measures the pressure in the air bellows 43, 44. Correspondingly the pressure in airbags 45, 46 provided at the front axle, which here are electrically controlled, may be detected by an optional pressure transducer.

To provide stability control a lateral acceleration sensor is provided, which may also be integrated with a yaw sensor, and the output of the lateral acceleration sensor is fed to the pressure control module/ECU 13. Typically the lateral acceleration sensor is integrated into the pressure control module/ECU 13. In the event that lateral acceleration on the trailer is detected, the pressure control module can provide for increased brake force at the front and/or rear axles. When the lateral acceleration sensor detects lateral acceleration on the trailer in which it is installed, the sensor generates a signal setting the stability control to active.

The pressure control module 13 receives data from the wheel speed sensors on the trailer and also receives a signal indicating whether the brake pedal in the vehicle cab is depressed or not, as well as the brake pressure demand.

FIG. 2 shows schematically the arrangement of the trailer access microcontroller with the trailer electronic braking system. The trailer electronic braking system is only partially illustrated for reasons of clarity but includes the pressure control module 13 which is shown receiving wheel speed signals from wheel speed sensors 5,6. The pressure control module 13 also receives inputs from the lift axles showing the position of the lift axles and also the steering lock. The pressure control module 13 also receives power and data via an electrical connection from the tractor and is also attached to an ISO 11992 CAN databus.

A trailer access point (TAP) comprising microcontroller 60 with a CAN interface is also provided, which is powered from the electrical connection. The microcontroller 60 itself comprises an interface to the on-board electronic systems and the trailer electronic braking system and an interface for sending and receiving data in a wireless format 61. The communications interface 61 can comprise one or more of a 802.11 transceiver or Bluetooth transceiver or radio transceiver. The trailer access point is connected to the CAN bus on the trailer and so is able to receive data from other devices on the CAN bus. The trailer access point can further be provided with USB ports, which enables the addition of peripheral devices on the trailer. An exemplary device on the CAN bus is the rear obstacle detector 62 and an exemplary device attached to the USB port is a reversing camera. The USB may be used in this case as the camera would generate large amounts of data compared to the remaining data on the CAN bus. A wifi camera may also be used.

The trailer access point can be mounted in a housing similar to that used for a trailer information module but without a display being necessary. If a display is needed, it would be possible to use a bistable cholestatic display or zero power LCD display.

In use when the trailer access point is powered, the provision of the access point enables the data from the devices to be read by another device with a client browser. Such devices could include a tractor navigation system or a smartphone. It would also be possible to use a laptop. The invention enables the data to be made available to the driver during normal operation as well as to a service technician for maintenance purposes at low cost using standard devices.

The trailer access point comprises the microcontroller with interface to the on-board electronic systems and the trailer electronic braking system and an interface for sending and receiving data in a wireless format; the microcontroller is adapted to operate with an optional display as described above and also with the onboard diagnostics. The trailer access point is also provided with USB ports, which facilitate the use of peripheral devices at low cost such as a webcam. A webcam could therefore be used as a reversing camera or it would be possible to use an internal webcam inside the trailer body. An internal webcam is attractive as it would enable free cargo space to be to be estimated by the driver or operator and would also help prevent thefts or stowaways. It would be possible if the trailer has sufficient communication bandwidth available to continuously monitor the contents of a trailer. It would also be possible to attach a number of devices to the CAN bus. Exemplary devices include door status or obstacle detection sensors or environment sensors.

Each trailer is provided with a vehicle identification number (VIN), which is usually provided on a plate on the side of the trailer. These plates are also often provided with a barcode or other machine readable data recording the same information. The wireless communication card on the trailer access microcontroller is provided with its own identifier such as the service set identifier or SSID for an 802.11 card. The SSID can also be set to be the same as or include the trailer VIN. The depot operator or truck driver is then provided with a device such as a smartphone so that the handheld device can be used to pair with the microcontroller and hence trailer with the truck. If the truck is provided with a navigation system, it may be used. To provide some additional security, the trailer access microcontroller may be provided with a list of allowed MAC addresses with which it is permitted to pair. As an alternative to the SSID, it would be possible to use the fleet number assigned by the fleet operator as the identifier.

However, in some situations such as in depots and trailer parks, long term pairing of a truck and trailer can give rise to problems. For example if the tractor returns to the same depot every day but is likely to be paired with different trailers each day then to would be easy for a driver to select the wrong trailer.

This problem can be addressed by preventing long term pairing. One way of achieving this would be to have a rolling SSID for each trailer. The SSID could be changed on a daily basis or on the basis of the actuation of the ignition. If the trailer makes regular long journeys which require rest stops, it would be possible to build in a time delay to the change of SSID once a trigger function condition was met so that the rest stop does not change the SSD. The trailer access point microcontroller can change the SSID by adding a prefix or suffix, which could then, for example, be incremented on a daily basis or on the basis of the actuation of the ignition.

Although the trailer access point has been specifically described as a microcontroller, it would be possible to incorporate the functionality as an auxiliary function in the trailer electronic brake control unit. The trailer electronic brake control unit receives the operational data from the sensor outputs but would need to have an additional communication interface to be able to provide the interface to the standards compliant browser or client.

What is claimed is:

1. A trailer electronic braking system, comprising:
    a braking system arrangement, including:
    a braking device capable of generating a braking force on at least one wheel located on at least one of a front axle and a rear axle of the trailer, wherein the braking force is controllable by an electropneumatic brake pressure control module, which is configured to selectably increase the braking force, and wherein the electropneumatic brake pressure control module is connected to a standards compliant communication bus on the trailer and is configured to receive data inputs from sensors on the trailer and to receive power via an electrical connection from the tractor;
    an interface arrangement to connect to trailer electronics;
    a communications interface; and
    a trailer identifier;
    wherein the communication interface includes a 802.11 wireless card, the 802.11 wireless card being adapted configured to transmit a service set identifier (SSID),
    wherein an 802.11 transmission of the SSID enables the braking system arrangement to be paired, using BLUETOOTH™ technology, with a further device within range of the 802.11 transmission,
    wherein the further device has previously been provided with the trailer identifier, the trailer identifier including the SSID, and
    wherein the SSID is changed to a second SSID when a pre-determined condition is met.

2. The trailer electronic braking system of claim 1, wherein the interface arrangement includes a microcontroller.

3. The trailer electronic braking system of claim 1, further comprising:
    a list of media access control (MAC) addresses associated with at least one allowable further device, the braking system detecting the MAC address of the at least one allowable further devices it detects such that it only pairs with an allowable MAC address.

4. The trailer electronic braking system of claim 1, wherein the allowable further device is provided with parking brake release codes, which codes can be transmitted to the electropneumatic brake pressure control module after pairing to thereby release a parking brake.

5. The trailer electronic braking system of claim 1, wherein the SSID is changed to a second SSID after a predetermined time interval.

6. The trailer electronic braking system of claim 1, wherein the SSID is changed to a second SSID after each logon.

7. The trailer electronic braking system of claim 1, wherein the SSID is changed to a second SSID after each logon or ignition actuation provided that a predetermined time interval is exceeded.

8. The trailer electronic braking system of claim 1, further comprising:
    a list of media access control (MAC) addresses associated with at least one allowable further device, the braking system detecting the MAC address of the at least one allowable further devices it detects such that it only pairs with an allowable MAC address;
    wherein the interface arrangement includes a microcontroller.

9. The trailer electronic braking system of claim 8, wherein the allowable further device is provided with parking brake releases codes, which codes can be transmitted to the electropneumatic brake pressure control module after pairing to thereby release the parking brake.

10. The trailer electronic braking system of claim 9, wherein the SSID is changed to a second SSID after a predetermined time interval.

11. The trailer electronic braking system of claim 9, wherein the SSID is changed to a second SSID after each logon.

12. The trailer electronic braking system of claim 9, wherein the SSID is changed to a second SSID after each logon or ignition actuation provided that a predetermined time interval is exceeded.

13. The trailer electronic braking system of claim 8, wherein the SSID is changed to a second SSID after a predetermined time interval.

14. The trailer electronic braking system of claim 8, wherein the SSID is changed to a second SSID after each logon.

15. The trailer electronic braking system of claim 8, wherein the SSID is changed to a second SSID after each logon or ignition actuation provided that a predetermined time interval is exceeded.

* * * * *